(12) United States Patent
Hennige et al.

(10) Patent No.: US 7,682,731 B2
(45) Date of Patent: Mar. 23, 2010

(54) SEPARATOR WITH LONG-TERM STABILITY FOR AN ELECTROCHEMICAL CELL

(75) Inventors: Volker Hennige, Duelmen (DE); Christian Hying, Rhede (DE); Gerhard Hoerpel, Nottuln (DE); Petr Novak, Brugg (CH); Jens Vetter, Wuerenlingen (CH)

(73) Assignee: Degussa AG, Duesseldorf (DE)

( * ) Notice: Subject to any disclaimer, the term of this patent is extended or adjusted under 35 U.S.C. 154(b) by 1191 days.

(21) Appl. No.: 10/535,400

(22) PCT Filed: Nov. 6, 2003

(86) PCT No.: PCT/EP03/12385

§ 371 (c)(1),
(2), (4) Date: May 18, 2005

(87) PCT Pub. No.: WO2004/049472

PCT Pub. Date: Jun. 10, 2004

(65) Prior Publication Data

US 2006/0046138 A1  Mar. 2, 2006

(30) Foreign Application Priority Data

Nov. 26, 2002 (DE) ............................... 102 55 122

(51) Int. Cl.
*H01M 2/18* (2006.01)
*H01M 2/16* (2006.01)

(52) U.S. Cl. .................. 429/142; 429/144; 429/145; 429/247

(58) Field of Classification Search ................ 429/142, 429/129, 247, 248, 251, 252, 144, 145, 304, 429/320
See application file for complete search history.

(56) References Cited

U.S. PATENT DOCUMENTS

| | | | |
|---|---|---|---|
| 5,885,657 A | 3/1999 | Penth et al. | |
| 6,299,668 B1 | 10/2001 | Penth et al. | |
| 6,299,778 B1 | 10/2001 | Penth et al. | |
| 6,306,594 B1 * | 10/2001 | Cozzette et al. ................ | 435/6 |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 | 9/2003 | Hying et al. | |
| 6,841,075 B2 | 1/2005 | Penth et al. | |
| 2002/0023419 A1 | 2/2002 | Penth et al. | |
| 2002/0023874 A1 | 2/2002 | Penth et al. | |
| 2002/0039648 A1 | 4/2002 | Horpel et al. | |
| 2002/0117256 A1 * | 8/2002 | McCormack et al. ........ | 156/289 |
| 2002/0187425 A1 * | 12/2002 | Savariar-Hauck et al. | 430/272.1 |
| 2004/0028913 A1 | 2/2004 | Hennige et al. | |
| 2004/0038105 A1 | 2/2004 | Hennige et al. | |
| 2004/0126653 A1 * | 7/2004 | Visco et al. .................. | 429/137 |
| 2004/0262169 A1 | 12/2004 | Hying et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2006/0078791 A1 * | 4/2006 | Hennige et al. ............. | 429/145 |
| 2008/0213661 A1 * | 9/2008 | Michot et al. ............... | 429/203 |

FOREIGN PATENT DOCUMENTS

| | | |
|---|---|---|
| DE | 101 15 927 | 10/2002 |
| DE | 101 15 928 | 10/2002 |

OTHER PUBLICATIONS

U.S. Appl. No. 12/063,626, filed Feb. 12, 2008, Hying, et al.
U.S. Appl. No. 11/917,914, filed Dec. 18, 2007, Holzapfel, et al.
U.S. Appl. No. 12/021,436, filed Jan. 29, 2008, Pascaly, et al.
U.S. Appl. No. 12/066,146, filed Mar. 7, 2008, Schormann, et al.
U.S. Appl. No. 10/575,734, filed Apr. 13, 2006, Hoerpel, et al.
U.S. Appl. No. 10/575,759, filed Apr. 13, 2006, Hennige, et al.
U.S. Appl. No. 10/575,268, filed Apr. 11, 2006, Hennige, et al.
U.S. Appl. No. 10/575,274, filed Apr. 11, 2006, Hennige, et al.
U.S. Appl. No. 11/578,664, filed Oct. 18, 2006, Hoerpel, et al.
U.S. Appl. No. 11/577,542, filed Apr. 19, 2007, Hoerpel, et al.
U.S. Appl. No. 10/519,097, filed Dec. 27, 2004, Hennige, et al.
U.S. Appl. No. 10/524,665, filed Feb. 11, 2005, Hennige, et al.
U.S. Appl. No. 10/524,145, filed Feb. 11, 2005, Hennige, et al.
U.S. Appl. No. 10/524,143, filed Feb. 11, 2005, Hennige, et al.
U.S. Appl. No. 10/524,669, filed Feb. 11, 2005, Hennige, et al.
U.S. Appl. No. 10/536,270, filed May 25, 2005, Hennige, et al.
U.S. Appl. No. 12/388,671, filed Feb. 19, 2009, Hennige, et al.

* cited by examiner

*Primary Examiner*—Raymond Alejandro
(74) *Attorney, Agent, or Firm*—Oblon, Spivak, McClelland, Maier & Neustadt, L.L.P.

(57) ABSTRACT

A separator for an electrochemical cell, comprising (A) a flexible perforate support, (B) a porous first ceramic material which fills the perforations in the support and which (i) has a pore structure which is characterized by an average pore size, and (ii) is suitable for receiving an ion-conducting electrolyte, wherein (C) the electrolyte-contactable pore surface of the first porous ceramic material is covered with fine particles of a further material to extend the use life, the average size of the fine particles being in the range from 0.5 to 30% and preferably in the range from 1 to 15% of the average pore size of the ceramic material.

24 Claims, No Drawings

SEPARATOR WITH LONG-TERM STABILITY FOR AN ELECTROCHEMICAL CELL

The present invention relates to a separator for an electrochemical cell, to a process for producing such a separator and also to an electrochemical cell which comprises such a separator.

As used herein, electrochemical cell or battery refers to batteries and accumulators (secondary batteries) of any kind, especially alkali metal such as for example lithium, lithium ion, lithium polymer, and alkaline earth metal batteries and accumulators, in the form of high energy or high power systems.

Electrochemical cells comprise electrodes of opposite polarity which are separated from each other by a separator while maintaining ion conductivity.

A separator is conventionally a thin porous electro-insulating material possessing high ion permeability, good mechanical strength and long-term stability to the chemicals and solvents used in the system, for example in the electrolyte of the electrochemical cell. In electrochemical cells, the separator should fully electronically insulate the cathode from the anode. Moreover, the separator has to be permanently elastic and to follow movements in the system, for example in the electrode pack in the course of charging and discharging.

The separator is a crucial determinant of the use life of the system in which it is used, for example the use life of an electrochemical cell. The development of rechargeable electrochemical cells or batteries is therefore influenced by the development of suitable separator materials. General information about electrical separators and batteries may be found for example at J. O. Besenhard in "Handbook of Battery Materials" (VCH-verlag, Weinheim 1999). High energy batteries are employed in various applications where the decisive requirement is that a very large amount of electrical energy be available. This is the case for example with traction batteries, but also with auxiliary power systems. The energy density is frequently reported in this field per unit weight [Wh/kg] or per unit volume [Wh/L]. Currently, high energy batteries reach energy densities of 350 to 400 Wh/L and of 150 to 200 Wh/kg. The power levels which such batteries are expected to supply are not that high, so that compromises can be made with regard to the internal resistance. In other words, the conductivity of the electrolyte-filled separator for example does not have to be as large as in the case of high power batteries, for example, so that the way is open to the use of other separator designs.

High energy systems, for instance, can even utilize polymer electrolytes whose conductivity at 0.1 to 2 mS/cm is fairly low. Such polymer electrolyte cells cannot be used as high power batteries.

Separator materials for use in high power battery systems have to have the following properties:

They need to be very thin to ensure low specific space requirements and to minimize the internal resistance. To ensure these low internal resistances, it is important that the separator also has a high porosity. Further, they have to be light in order that a low specific weight may be achieved. In addition, wettability has to be high, since otherwise unwetted dead zones are formed.

There are many applications, especially mobile applications, where very large amounts of energy are required, eg in traction batteries. The batteries in these applications thus store large amounts of energy in the fully charged state. The separator has to be safe for these batteries, since very large specific electric energy quantities are transported in these batteries. These energies must not in any way be released in an uncontrolled fashion in the event of a dysfunction of the battery or of an accident, since this would ineluctably lead to the cell exploding and going up in flames.

Currently used separators consist predominantly of porous organic polymeric films or of inorganic nonwoven web materials, for example webs composed of glass or ceramic materials or else ceramic papers. These are manufactured by various companies. Important producers here are: Celgard, Tonen, Ube, Asahi, Binzer, Mitsubishi, Daramic and others.

Separators composed of inorganic nonwovens or of ceramic paper are mechanically very unstable and tend to short circuit, with the result that it is impossible to achieve a long use life.

A typical organic separator consists for example of polypropylene or of a polypropylene-polyethylene-polypropylene composite. A substantial disadvantage of these organic polyolefin separators is their low thermal stability limit of below 150° C. Even brief attainment of the melting point of these polymers leads to substantial melting of the separator and to short circuiting in the electrochemical cell utilizing such as separator. The use of such separators is therefore generally not safe. This is because when higher temperatures are attained, especially temperatures of above 150° C. or even 180° C., these separators are destroyed.

As well as this instability at high temperatures, polymer-based separators have further serious disadvantages with regard to chemical stability. The polymers in the electrochemical cells are slowly but continually attacked by contact with the electrodes even at normal operating and charging temperatures such as room temperature. Problems arise in particular with the use of such separators in electrochemical cells which utilize lithium. The polymer is slowly attacked at the contact surface of the separator with the lithium or the lithiated graphite. Moreover, polymeric separators are also attacked in the interior of the separator by the materials which form during the operation of an electrical cell. As a result, these separators can no longer reliably protect the electrodes against short circuiting. The use life is reduced as a result. In addition, the capacity of an electrochemical cell which utilizes such separators decreases over time.

There have been initial attempts to use inorganic composite materials as separators in order to overcome these disadvantages. For instance, DE 198 38 800 C1 proposes an electrical separator having a composite structure that comprises a sheetlike flexible substrate having a multiplicity of openings and having a coating on the substrate. The material for the substrate is selected from metals, alloys, plastics, glass and carbon fiber or the combination thereof, and the coating is a two-dimensionally continuous porous electrically nonconducting ceramic coating. The use of a ceramic coating promises thermal and chemical stability. The separators, which as exemplified are supported by a carrier or substrate composed of electrically conductive material, however, have been determined to be unsuitable for electrochemical cells, since the coating has proved impossible to produce over a large area without flaws at the thickness described and consequently short circuiting can occur very easily. Nor are such thin metal fabrics as required for very thin separators commercially available. We were able to show in previous work (DE 101 42 622) that a material comprising a sheetlike flexible substrate having a multiplicity of openings and having a coating on and in this substrate, the material of the substrate being selected from woven or non-woven nonelectroconductive fibers of glass or ceramic or a combination thereof and a coating being a porous electrically insulating ceramic coating, can be used to produce a separator which has a thickness of less than 100 µm and is bendable, the resulting separator having a sufficiently low resistance in connection with the electrolyte and yet possessing sufficiently good long-term stability. The separator described in DE 101 42 622 possesses very high conductivity, but the separator described therein still does not meet the requirements of an industrially useful separator with regard to thickness and weight and also safety.

In DE 102 08 277, the weight and thickness of the separator was reduced by using a polymeric nonwoven, but the separator embodiments described therein likewise still do not meet all requirements of the separator for a lithium high energy battery, especially because particular emphasis was placed in this application on very large pores for the separator. But the particles described therein, up to 5 μm in size, do not permit the production of separators which are 10-20 μm in thickness, since only few particles would come to rest on top of each other here. As a result, the separator would inevitably have a large defective and disruptive site density (eg holes, cracks, . . . ). Moreover, the large particles in this reference consist of $Al_2O_3$ and $ZrO_2$. Owing to the high density of these ceramics, these separators have high basis weight, which reduces the mass-based specific energy density in Wh/g.

But even this more or less inorganic separator will react over time with the electrodes or with other materials present in the battery. This limits the use or service life of the battery, especially at elevated temperatures, in particular in the course of the operation and in the course of the storage of batteries which are equipped with such separators.

It therefore is an object of the present invention to provide a separator for an electrochemical cell that has an increased use life.

This object is achieved by a separator for an electrochemical cell, comprising
(A) a flexible perforate support,
(B) a porous first ceramic material which fills the perforations in the support and which
  (i) has a pore structure which is characterized by an average pore size, and
  (ii) is suitable for receiving an ion-conducting electrolyte, characterized in that
(C) the electrolyte-contactable pore surface of the first porous ceramic material is covered with fine particles of a further material to extend the use life, the average size of the fine particles being in the range from 0.5 to 30% and preferably in the range from 1 to 15% of the average pore size of the ceramic material.

Preferably, the fine particles consist of a ceramic material.

Advantageously, such a separator where the pores of a ceramic composite are coated with fine particles has a longer use life than a ceramic composite which is not coated with fine particles. Surprisingly, such a separator according to the present invention also exhibits high ion conductivity, even though the volume available for the electrolyte is reduced in size by the fine particles.

The material for the fine particles can be identical to or different from the porous ceramic material. In a preferred embodiment of the separator of the present invention, the material of the fine particles is different from the porous ceramic material. The fine particles may comprise for example $SiO_2$, $Al_2O_3$, $ZrO_2$ or sic.

In a particularly preferred embodiment of the present invention, the fine particles comprise $Li_2CO_3$, $Li_3N$, $LiAlO_2$ or $Li_xAl_yTi_z(PO_4)_3$ where $1 \leq x \leq 2$, $0 \leq y \leq 1$ and $1 \leq z \leq 2$. These particles advantageously enhance the conductivity of the separator for ions.

The separator of the present invention may comprise an electrolyte for ion conductance. Preference is given to an alkali and alkaline earth metal ion conductance and particular preference is given to a lithium ion conductance.

The separator of the present invention may have the fine particles incorporated into the porous first ceramic material and exposed on the pore surface. In a further embodiment of the invention, the porous first ceramic material is merely coated with the fine particles on the pore surface.

The ceramic material of the separator according to the present invention preferably has an average pore size in the range from 50 nm to 5 μm. The porous ceramic material comprising fine particles may further have a porosity in the range from 10% to 70%. Preference is given to a porosity in the range from 20% to 50%. The ceramic material of the separator according to the present invention preferably comprises an oxide of zirconium, silicon and/or preferably aluminum.

In a preferred embodiment of the invention, the first ceramic material of the separator is producible by solidifying a slip which contains particles having a large average particle size which determine the pore structure of the ceramic material and also particles having a smaller average primary particle size which adhere the large particles together in the course of the solidification of the slip.

The separator of the present invention preferably comprises a perforate support which comprises polymeric fibers, glass or ceramic.

In a preferred embodiment of the present invention, the perforate support comprises fibers, preferably selected from fibers of polyamide, polyacrylonitrile, polyester, eg polyethylene terephthalate (PET) and/or polyolefin, eg polyethylene (PE) or polypropylene (PP), glass fibers or ceramic fibers. When the perforate support comprises polymeric fibers, polymeric fibers other than those mentioned above may be used, provided they not only have the thermal stability required for producing the separators but also are stable under the operating conditions in an electrochemical cell, preferably a lithium battery. In a preferred embodiment, the separator according to the invention comprises polymeric fibers having a softening temperature of above 100° C. and a melting temperature of above 110° C.

The support may comprise fibers and/or filaments from 1 to 150 μm and preferably from 1 to 20 μm in diameter and/or yarn from 3 to 150 μm and preferably from 10 to 70 μm in diameter.

In a further embodiment of the invention, the support is a nonwoven having a pore size from 5 to 500 μm and preferably from 10 to 200 μm.

The separator of the invention may be from 10 to 1 000 μm, preferably from 10 to 100 μm and most preferably from 10 to 50 μm in thickness.

The separator of the invention is by virtue of its composite structure able to tolerate a bending radius down to 100 mm, preferably down to 20 mm and most preferably down to 1 mm. The separator of the present invention is by virtue of its construction according to the invention very useful for electrochemical cells possessing high capacity and high energy density. More particularly, the separator according to the invention is useful for electro-chemical cells which are based on the transference of alkali and/or alkaline earth metal ions, such as lithium-metal and lithium ion batteries for example. It is therefore advantageous when the separators also possess the protective measures specific to this application, such as shutdown and meltdown with a high short circuiting temperature. Shutdown refers to a measure in which the separator may have incorporated into it materials which are to be selected for certain operating temperatures and melt easily, such as thermoplastic materials for example. In the event of a rise in the operating temperature due to upsets such as overcharging or external or internal short circuiting, such easy-melting materials can melt and plug the pores of the separator. Thus the ion flux through the separator is partially or completely blocked and a further rise in the temperature is prevented. Meltdown refers to the property that the separator will melt completely at a short circuiting temperature. Large areas of the electrodes in an electrochemical cell can then come into contact and short circuit. A very high short circuiting temperature is desirable for safe operation of an electrochemical cell possessing high capacity and energy density. The separator according to the invention has an important advantage in this respect. This is because the ceramic material which adheres to the perforate support in the case of the separator of the present invention has a melting point which is far above the safety-relevant temperature range for electrochemical cells. The separator of the present invention therefore possesses outstanding safety. This is because, in a preferred safe embodiment, it is stable under service conditions of not less than 50° C. More preferably, it is stable at not less than 100° C., 150° C. and most preferably at not less than 180° C.

Polymeric separators provide for example the safety demanded at present for lithium batteries by stopping any ion transport through the electrolyte from a certain temperature (the shutdown temperature of about 120° C.). This happens because at this temperature the pore structure of the separator collapses and all the pores are closed. Because ions can no longer be transported, the dangerous reaction which can lead to explosion ceases. But if the cell continues to undergo heating because of external circumstances, then the breakdown temperature is exceeded at about 150 to 180° C. At this temperature, the separator melts and contracts. Direct contact then comes about between the two electrodes at many places in the battery cell, leading to internal short circuiting over a large area. This leads to an uncontrolled reaction which ends with an explosion of the cell, or the resultant pressure is released by an overpressure valve (a bursting disk), frequently with signs of fire.

In a particularly preferred embodiment of the invention, the flexible perforate support of the separator comprises polymeric fibers. This hybridic separator, comprising a combination of inorganic components and of polymeric support material, undergoes shutdown when the high temperature causes the polymer structure of the support material to melt and to penetrate into the pores of the inorganic material, thereby closing them. But meltdown does not occur with the separator according to the invention. By virtue of its shutdown mechanism in the battery cells, the separator according to the invention thus meets the requirements, voiced by various battery manufacturers, for a safety switchoff mechanism. The inorganic particles ensure there can never be a meltdown. It is thus ensured that there are no operating states where large-area short circuiting can occur.

It may be preferable for the separator to comprise an additional, noninherent shutdown mechanism. This additional, noninherent shutdown mechanism may be achieved for example when a very thin layer of waxy or polymeric shutdown particles, which melt at a desired shutdown temperature, is present on or in the separator. Particularly preferred materials for shutdown particles include for example natural or artificial waxes, low-melting polymers, for example polyolefins, the material for the shutdown particles being chosen so that the particles melt at the desired shutdown temperature and close the pores of the separator to prevent further ion flux.

Preferably, the shutdown particles have an average particle size ($D_w$) which is not less than the average pore size ($d_s$) of the pores of the porous inorganic layer of the separator. This is advantageous in particular because this prevents penetration and closing of the pores of the separator layer that will result in a reduction in the pore volume and hence in separator performance and also battery performance. The thickness of the shutdown particle layer is only critical insofar as an excessively thick layer would increase the resistance in the battery system unnecessarily. To achieve safe shutdown, the shutdown particle layer should have a thickness ($z_w$) which is approximately in the range from the average particle size of the shutdown particle ($D_w$) up to 10 $D_w$ and preferably in the range from 2 $D_w$ to $D_w$. A thus equipped separator comprises a primary safety feature. In contrast to the all-organic separator materials, however, this separator cannot melt completely and there can never be a meltdown. These safety features are very important for high energy batteries owing to the very large energy quantities and therefore are frequently mandated.

The separator according to the invention is also very safe in the event of internal short circuiting due to an accident for example. If, for example, a nail would puncture a battery, the following would happen, depending on the type of separator: a polymeric separator would melt at the site of puncture (a short circuit current flows through the nail and causes it to heat up) and contract. As a result, the short circuiting location will become larger and larger and the reaction would get out of control. Only the polymeric substrate material at most would melt at the hybridic separator of the present invention, but not the inorganic separator material. So the reaction in the interior of the battery cell following such an accident would proceed much more moderately. This battery is thus distinctly safer than one with a polymeric separator. This is an important factor in mobile applications in particular.

The above-described inventive separator for an electrochemical cell may be produced by the following processes. The first of these processes comprises the following steps:
(a) applying a dispersion as a thin layer onto and into a woven and/or nonwoven, the dispersion comprising
  (a1) large ceramic particles whose average particle size provides a pore structure to the layer that is characterized by an average pore diameter,
  (a2) fine particles whose average particle size is in the range from 0.5 to 30% and preferably in the range from 1 to 15%, of the average particle size of the ceramic material, and also
  (a3) optionlly, ceramic particles having an average primary particle size which is substantially less than the average particle size of the ceramic particles as per (a1) and (a2), and
(b) solidifying the dispersion at a temperature from 100° C. to 680° C. to form a separator.

This process has the advantage that it can be carried out in few steps.

The second process for producing an electrochemical cell separator according to the present invention comprises the following steps:
(i) providing a composite formed from a perforated support, preferably a woven and/or nonwoven, and also a porous ceramic material whose pore structure is characterized by an average pore size,
(ii) treating the composite with a dispersion of fine particles having an average particle size in the range from 0.5 to 30% and preferably in the range from 1 to 15% of the average pore size in a dispersion medium so that the electrolyte-accessible pore surface of the composite is coated with the dispersion and the dispersion preferably contains from 1 to 25% by weight, especially from 5 to 15% by weight of fine particles;

(iii) drying the dispersion at a temperature in the range from 100° C. to 680° C. so that the coated pore surface is coated with the fine particles.

This process has the advantage that only the pore surface becomes covered with the fine particles. Furthermore, the dispersion of fine particles in step (ii) is independent of the chemistry of a slip for producing the composite.

In the second process, the composite can be a separator which is obtainable by the first process.

In either of the processes described, the dispersion may contain one or more additional components which are selected from adhesion promoters, dispersing assistants, agents for setting the viscosity, agents for setting the flow properties or other customary assistants for producing dispersions. The adhesion promoters, for example the functionalized silanes described hereinbelow, are particularly advantageous in that they are able to bind the first ceramic material particularly firmly to the flexible perforate support composed of polymer, glass or ceramic. For example, functionalized silane adhesion promoters may be particularly preferable when the support comprises a polymeric material. But adhesion promoters may similarly advantageously be sols which preferentially bind the fine particles firmly to the first porous ceramic material. Advantageously, the dispersion in the processes for producing the first porous ceramic material comprises an adhesion promoter selected from the group consisting of aluminum oxide, silicon oxide and zirconium oxide. These oxides may be present in hydrolyzed form or nonhydrolyzed form of appropriate precursor compounds in a dispersion. The dispersion medium for the dispersions of the processes according to the present invention may contain water or water-containing solvents, for example alcohols, esters, ketones, etc, and the fine particles may be hydrolysis-stable element oxide particles.

But the dispersion medium may also be an anhydrous organic solvent, for example a hydrocarbon, N-methyl-pyrrolidone (NMP), dimethyl sulfoxide (DMSO), etc, especially when the fine particles comprise hydrolysis-sensitive materials, such as $Li_3N$ for example.

The fine particles should be present in thoroughly dispersed form. This can be accomplished by prolonged stirring, the use of ultrasonic dispersers, Ultraturrax or high-performance mills (eg Attritor).

The process for applying a dispersion as a thin layer onto and into a flexible perforate support, such as a woven or nonwoven, to produce a composite comprising this flexible perforate support and a porous first ceramic material which fills the perforations in the support and the preparation of a composite comprising a perforate support and a porous ceramic material whose pore structure is characterized by an average pore size are known in principle from WO 99/15262. However, not all the parameters or ingredients, especially nonelectroconductive ingredients, can be used for producing the separator of the present invention. In particular, the ceramic particles which are used for producing the dispersion and fine particles and also the materials used as a flexible perforate support differ from the ingredients described there.

The dispersion may be applied for example by printing on, pressing on, pressing in, rolling on, knifecoating on, spreadcoating on, dipping, spraying or pouring on onto and into the flexible perforate support.

The dispersion used for applying onto and into the flexible perforate support may comprise a sol of the elements Al, Zr and/or Si, and is produced in this case by dispersing the ceramic particles and fine particles in one of these sols. The sols are obtainable by hydrolyzing at least one compound with water or an acid or a combination of these compounds. It may be preferable to introduce the compound to be hydrolyzed into an alcohol or an acid or a combination of these liquids prior to hydrolysis. The compound to be hydrolyzed is preferably at least one nitrate, chloride, carbonate, alkoxide or an organoelement compound of the elements Al, Zr and/or Si. The hydrolysis is preferably carried out in the presence of liquid water, water vapor, ice or an acid or a combination thereof.

In an embodiment of the process according to the invention, hydrolysis of the compounds to be hydrolyzed is used to prepare particulate sols. These particulate sols are notable for the compounds formed by hydrolysis being present in the sol in particulate form. Particulate sols can be prepared as described above or as in WO 99/15262. These sols customarily have a very high water content, which is preferably above 50% by weight. It may be preferable for the compound to be hydrolyzed to be introduced into alcohol or an acid or combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof. The particulate sols thus produced may subsequently be used for producing dispersions, in which case it is preferable to produce dispersions for application to fiber webs which have been pretreated with polymeric sol.

In a further embodiment of the process according to the invention, hydrolysis of the compounds to be hydrolyzed is used to prepare polymeric sols. In this preferred embodiment of the process according to the invention, the sol has a water and/or acid fraction of less than 50% by weight. These polymeric sols are notable for the fact that the compounds formed by hydrolysis are present in the sol in polymeric form, ie in the form of chains crosslinked across a relatively large space. Polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To produce sols having a desired very low fraction of water and/or acid in the sol, it may be preferable for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus produced may be used for producing the suspension of the present invention.

Both the particulate sols (high water fraction, low solvent fraction) and polymeric sols (low water fraction, high solvent fraction) are useful as a sol to produce the dispersion in the process of the present invention. Not just sols which are obtainable as just described can be used, but in principle also commercially available sols, for example zirconium nitrate sol or silica sol. The process of producing separators by applying a suspension to and solidifying it on a support is known per se from DE 101 42 622 and in similar form from WO 99/15262, but not all the parameters and ingredients are applicable to the production of the membrane of the present invention. More particularly, the operation described in WO 99/15262 is in that form not fully applicable to polymeric nonwoven materials, since the very watery sol systems described therein frequently do not permit complete, in-depth wetting of the customarily hydro-phobic polymeric nonwovens, since most polymeric nonwovens are only badly wetted by the very watery sol systems, if at all. It has been determined that even the minutest unwetted areas in the nonwoven material can lead to membranes or separators being obtained that have defects and hence are inutile.

It has now been found that, surprisingly, a sol system or dispersion whose wetting behavior has been adapted to the polymers will completely penetrate the nonwoven materials and so provide defect-free coatings. In the process of the present invention, it is therefore preferable to adapt the wetting behavior of the sol or dispersion. This is preferably accomplished by producing sols or dispersions comprising one or more alcohols, for example methanol, ethanol or propanol or mixtures thereof, and/or aliphatic hydrocarbons. But other solvent mixtures are conceivable as well for addition to the sol or suspension in order that the wetting behavior thereof may be adapted to the nonwoven used.

The mass fraction of the suspended component (metal oxide particles) in the suspension is preferably from 1 to 100 times, more preferably from 1 to 50 times and most preferably from 1 to 10 times that of the sol used. It is particularly preferable for the metal oxide particles used for preparing the dispersion to be aluminum oxide particles which preferably have an average particle size from 0.1 to 10 μm, in particular from 0.5 to 5 μm. Aluminum oxide particles in the range of the preferred particle sizes are available for example from Martinswerke under the designations MDS 6; DN 206, MZS 3 and MZS 1 and from Alcoa with the designation CL3000 SG, CT800 SG and HVA SG.

It has been determined that the use of commercially available metal oxide particles may in certain circumstances lead to unsatisfactory results, since the particle size distribution is frequently very large. It is therefore preferable to use metal oxide particles which were classified by a conventional process, for example wind sifting, centrifugation and hydroclassification. It is preferable for the metal oxide particles used to be a fraction for which the coarse grain fraction, which accounts for up to 10% of the total amount, was separated off by wet sieving. This unwelcome coarse grain fraction, which is very difficult or impossible to comminute even by the typical processes of slip production such as, for example, grinding (ball mill, attritor mill, pestle mill), dispersing (Ultra-Turrax, Ultrasound), trituration or chopping, can consist for example of aggregates, hard agglomerates, grinding media attritus. The aforementioned measures ensure that the inorganic porous layer has a very uniform pore size distribution. This is achieved in particular by using metal oxide particles whose maximum particle size is preferably from 1/3 to 1/5 and more preferably more than 1/10 of the thickness of the nonwoven used.

Table 1 hereinbelow gives an overview of how the choice of the various aluminum oxides affects the porosity and the resulting pore size of the respective porous inorganic coating. To determine these data, the corresponding slips (suspensions or dispersions) were prepared and dried and solidified as pure moldings at 200° C.

TABLE 1

Typical data of ceramics as a function of powder type used

| $Al_2O_3$ type | Porosity/% | Average pore size/nm |
|---|---|---|
| AlCoA CL3000SG | 51.0 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47% | 445 |
| Martinsw. MZS 3 | 48% | 690 |

To improve the adhesion of the inorganic components to polymeric fibers as a substrate, it can be advantageous for the suspensions used to be admixed with adhesion promoters, for example organofunctional silanes. Useful adhesion promoters include in particular compounds selected from the octylsilanes, the vinylsilanes, the amine-functionalized silanes and/or the glycidyl-functionalized silanes, for example the Dynasilanes from Degussa. Particularly preferred adhesion promoters for polymeric fibers such as polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected so that the solidification temperature is below the melting or softening temperature of the polymer used as substrate and below its decomposition temperature. Dispersions according to the present invention preferably include distinctly less than 25% by weight and more preferably less than 10% by weight of compounds capable of acting as adhesion promoters. An optimal fraction of adhesion promoter results from coating the fibers and/or particles with a mono-molecular layer of the adhesion promoter. The amount in grams of adhesion promoter required for this purpose can be obtained by multiplying the amount in g of the oxides or fibers used by the specific surface area of the materials in $m^2g^{-1}$ and then dividing by the specific area required by the adhesion promoter in $m^2g^{-1}$, the specific area required frequently being in the order of from 300 to 400 $m^2g^{-1}$.

Table 2 which follows contains an illustrative overview of usable adhesion promoters based on organofunctional silicon compounds for typical nonwoven material polymers.

TABLE 2

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |

TABLE 2-continued

| Polymer | Organofunctional type | Adhesion promoter |
|---|---|---|
| PE, PP | Amino<br>Vinyl<br>Methacryloyl | AMEO, AMMO<br>VTMO, VTEO, Silfin<br>MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris (2-methoxyethoxy) silane In a particular embodiment of the process according to the present invention, the abovementioned adhesion promoters are applied to the flexible perforate support such as a polymeric nonwoven for example in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or $HNO_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied in this embodiment of the process according to the present invention that the dispersion is applied and solidified.

Application of an adhesion promoter prior to the actual application of the dispersion provides improved adhesivity of the flexible substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the separator according to the present invention has to be extended to include an intervening or preliminary treatment step. This is feasible albeit more costly and inconvenient than the use of adapted sols to which adhesion promoters have been added, but also has the advantage that better results are obtained even on using dispersions based on commercially available sols.

The coatings according to the invention are applied into and onto the substrate by solidifying the dispersion in and on the substrate and onto at least one side of a layer of porous ceramic material. According to the present invention, the dispersion present on and in the substrate can be solidified by heating at from 50 to 350° C. Since the maximum temperature is dictated by the polymeric nonwoven used when polymeric substrate materials are used, the maximum temperature must be adapted accordingly. Thus, depending upon the embodiment of the process according to the present invention, the dispersion present on and in the nonwoven is solidified by heating at from 100 to 350° C. and most preferably by heating at from 110 to 280° C. It can be advantageous for the heating to take place at from 100 to 350° C. for from 1 second to 60 minutes. It is more preferable to solidify the dispersion by heating at from 110 to 300° C. and most preferably at from 110 to 280° C. and preferably for from 0.5 to 10 min.

The assembly may be heated according to the present invention by means of heated air, hot air, infrared radiation or by other heating methods according to the prior art.

The process according to the present invention can be carried out for example by unrolling the flexible substrate for example a polymeric nonwoven off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the substrate, for example a roller, and at least one further apparatus whereby the dispersion is solidified on and in the support by heating, for example an electrically heated furnace, and rolling the separator thus produced up on a second roll. This makes it possible to produce the separator according to the present invention in a continuous process. Similarly, the pretreatment steps can be carried out on a continuous basis by observing the parameters mentioned.

It has been determined to be particularly advantageous for the process to be carried out with the substrate and especially the polymeric nonwoven having a maximum tension of 10 N/cm and preferably of 3 N/cm in the longitudinal direction during the coating operation or operations. The term "coating operations" refers in this context to all process steps in which a material is brought onto and into the substrate and is solidified there by heat treatment, ie including the application of the adhesion promoter. Preferably, the substrate is tensioned with a maximum force of 0.01 N/cm during the coating operations. It may be particularly preferable for the substrate to be tensionless in the longitudinal direction during the coating operation or operations.

The pulling tension can be controlled during the coating in order that no deformation, even an elastic one, of the carrier material may take place. Possible deformation (stretching) due to excessive pulling tension can mean that the ceramic coating cannot follow the substrate material of construction, the consequence being that the coating will become detached from the nonwoven material over the entire area. The resulting product can then not be used for the intended purpose.

The separator according to the present invention may be equipped with an additional automatic shutdown mechanism by, for example, applying a layer of particles which, at a desired temperature, melt and close the pores of the separator, so-called shutdown particles, to the separator after the solidification of the applied dispersion on the substrate to create a shutdown mechanism, and fixing the layer of shutdown particles. The layer of shutdown particles can be created for example by applying a suspension of waxy particles having an average particle size larger than the average pore size of the separator in a sol, water, solvent or solvent mixture.

The suspension for applying the particles contains preferably from 1 to 50% by weight, more preferably from 5 to 40% by weight and most preferably from 10 to 30% by weight of shutdown particles, especially wax particles, in the suspension.

Since the inorganic coating on the separator frequently has a very hydrophilic character, it has been determined to be advantageous for the coating on the separator to be prepared using a silane in a polymeric sol as an adhesion promoter and thus be hydro-phobicized. To achieve good adhesion and uniform dissipation of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic coating is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alia for textiles (D. Knittel; E. Schollmeyer; *Melliand Textilber.* (1998) 79(5), 362-363), with minimal changes to the recipes, for the porous coatings on the separator as well. To this end, the coating or separator is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy-(3,3,4,4,5,5,6,6,7,7,8,8-tridecafluorooctyl)silane, but a treatment with methyltriethoxysilane or i-butyl-triethoxysilane is completely sufficient to obtain the desired effect. The solutions are stirred at room temperature to achieve uniform dissipation of the hydrophobic materials in the solution and subsequently applied to the inorganic coating on the separator and dried. Drying can be speeded up by treatment at temperatures from 25 to 100° C.

In a further version of the process according to the present invention, the porous inorganic coating can also be treated with other adhesion promoters before the shutdown particles are applied. The treatment with one of the hereinbelow mentioned adhesion promoters can then likewise be effected as described above, ie by treating the porous inorganic layer with a polymeric sol which includes a silane adhesion promoter.

The layer of shutdown particles is preferably created by applying to the inorganic coating on the separator a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size ($D_w$) of not less than and preferably greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 50% by weight and preferably from 0.5% to 10% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to an inorganic layer of the separator even when the layer was not hydrophobicized beforehand. It will be appreciated that a suspension with adhesion promoter can also be applied to a hydrophobicized layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxy-silane), MEMO (3-methacryloyloxypropyltrimethoxy-silane), Silfin (vinylsilane+initiator+catalyst), VTEO (vinyltriethoxysilane) or VTMO (vinyltrimethoxy-silane). Such silanes are available for example from Degussa as an aqueous solution under the designation Dynasilane 2926, 2907 or 2781. An adhesion promoter fraction of not more than 10% by weight has been determined to be sufficient for ensuring sufficient adhesion of the shutdown particles to the porous inorganic layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of poly-propylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the shutdown particles to be fixed after they have been applied to the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the shutdown particle suspension with subsequent drying and any heating to above the glass transition temperature can be carried out continuously or quasicontinuously. When the starting material used is a flexible separator it can again be unwound off a roll, passed through a coating, drying and, if used, heating apparatus and then be rolled up again.

The invention also provides an electrochemical cell, especially a lithium battery, lithium ion battery or a lithium polymer battery, comprising one of the above-described separators.

The electrolyte which is used in such an electrochemical cell can be any customary electrolyte which can be used in electrochemical cells. Examples which can be mentioned include solutions of a soluble lithium salt in one or more organic solvents, for example ethylene carbonate and dimethyl carbonate (EC-DMC). Other suitable nonaqueous solvents include for example γ-butyrolactone, tetrahydrofuran, 1,2-dimethoxyethane, propylene carbonate, diethyl carbonate, methyl ethyl carbonate, diethoxyethane, dioxolane and methyl formate. Suitable soluble lithium salts are those customarily used. Examples which may be mentioned include $LiPF_6$, $LiAsF_6$, $LiBF_4$, $LiClO_4$, $LiCF_3SO_3$, $LiN(CF_3SO_2)_3$ and $LiN(C_2F_5SO_2)_3$, of which $LiPF_6$ is particularly preferred.

The present invention also includes the use of an inventive separator for producing an electrochemical cell, especially a lithium battery, lithium ion battery or a lithium polymer battery, each preferably for high current applications.

Preferably, the electrochemical cell is rechargeable.

By average pore size and porosity is meant the average pore size and the porosity which can be determined by the familiar method of mercury porosimetry using a 4000 porosimeter from Carlo Erba Instruments. Mercury porosimetry rests on the Washburn equation (E. W. Washburn, "Note on a Method of Determining the Distribution of Pore Sizes in a Porous Material", *Proc. Natl. Acad. Sci.*, 7, 115-16 (1921)).

INVENTIVE, TEST AND REFERENCE EXAMPLES

Reference Example 1

S450PET Separator

To 130 g of water and 15 g of ethanol are initially added 30 g of a 5% by weight aqueous $HNO_3$ solution, 10 g of tetraethoxysilane, 2.5 g of methyltriethoxysilane and 7.5 g of the Dynasilane GLYMO. This sol, which was initially further stirred for some hours, was then used to suspend 125 g each of the Martoxid MZS-1 and Martoxid MZS-3 aluminum oxides, in order to obtain a slip (suspension). This slip is homogenized with a magnetic stirrer for at least a further 24 h, during which the stirred vessel has to be covered over in order that no solvent may be lost.

The above slip is then used to coat a 56 cm wide PET nonwoven having a thickness of about 13 μm and a basis weight of about 6 g/m² using a continuous roller coating process at a belt speed of about 30 m/h and T=200° C. This results in a separator having an average pore size of 450 nm, which possessed very good adhesion and a thickness of about 30 μm.

Test Example 1

Lithium Battery with S450PET Separator from Reference Example 1

The S450PET separator produced in reference example 1 is installed in a lithium ion cell consisting of a positive mass of $LiCoO_2$, a negative mass consisting of graphite and an electrolyte of $LiPF_6$ in ethylene carbonate/dimethyl carbonate (EC/DMC) [$LiCoO_2$//S450PET, EC/DMC 1:1, 1M $LiPF_6$//graphite]. The charging behavior of this battery was tested. After more than 250 cycles, the battery exhibits a clear drop in capacity of up to 25%.

The capacity of this battery decreased even more distinctly after 200 cycles when the cell is stored at elevated temperature (50-60° C.) in the fully charged, partially charged or discharged state between the cycles.

Production of Inventive Separators

Inventive Example 1

Production of an Inventive S100PET Separator

To 145 g of water are initially added 30 g of a 5% by weight aqueous HCl solution, 10 g of tetraethoxysilane, 2.5 g of methyltriethoxysilane and 7.5 g of the Dynasilane GLYMO. The sol obtained in this manner, which was initially further stirred for some hours, is then used to suspend 140 g of the AlCoA CT3000 aluminum oxide and 7 g of Aerosil Ox50. This suspension is homogenized with a magnetic stirrer for at least a further 72 h, during which the stirred vessel has to be covered over in order that no solvent may be lost.

The above suspension is then used to coat a 56 cm wide PET nonwoven having a thickness of about 13 μm and a basis weight of about 6 g/m² using a continuous roller coating process at a belt speed of about 30 m/h and T=200° C. This provides a separator having an average pore size of 80 nm, which possesses very good adhesion and a thickness of about 24 μm.

Inventive Example 2

Production of an Inventive S240 PF-T Separator

To 140 g of water and 10 g of ethanol were initially added 30 g of a 5% by weight aqueous HCl solution, 10 g of tetraethoxysilane, 2.5 g of methyltriethoxysilane and 7.5 g of the Dynasilane GLYMO. The sol obtained in this manner, which was initially further stirred for some hours, was then used to suspend 265 g of the AlCoA CT1200 aluminum oxide and 3.3 g $Li_{1.3}Al_{0.7}Ti_{1.4}(PO_4)_3$. This suspension (slip) is homogenized with a magnetic stirrer for at least a further 24 h, during which the stirred vessel has to be covered over in order that no solvent may be lost.

The above suspension is then used to coat a 56 cm wide PET nonwoven having a thickness of about 13 μm and a basis weight of about 6 g/m² in a continuous roller coating process at a belt speed of about 30 m/h and T: 200° C. This provides a separator having an average pore size of 240 nm, which possesses very good adhesion and a thickness of about 27 μm.

Inventive Example 3

Production of an Inventive S450PET Separator

A separator produced as per reference example 1 is coated with an aqueous 1% by weight suspension of finely divided $ZrO_2$ (VPH, Degussa AG) in a continuous impregnating operation and dried at 210° C.

Inventive Example 4

Production of an Inventive S800PET Separator

A separator produced as per reference example 1 is coated with an anhydrous ethanolic 1% by weight suspension of finely divided $Li_3N$ in a continuous impregnating operation and dried at 210° C.

Test Example 2

Lithium Battery with S450PET Separator

The S450PET separator produced in example 3 was installed in a lithium ion cell consisting of a positive mass of $LiCoO_2$, a negative mass consisting of graphite and an electrolyte of $LiPF_6$ in ethylene carbonate/dimethyl carbonate (EC/DMC) [$LiCoO_2$//S450PET, EC/DMC 1:1, 1M $LiPF_6$//graphite]. The charging behavior of this battery was tested. After more than 500 cycles, the battery exhibited only a very minimal drop in capacity of a few percentage points. Even increasing the charging voltage from 4.1 to 4.2 in the 450th charging cycle did not harm the battery.

The capacity of the cells decreases only very moderately even on storage of this battery at elevated temperature (50-60° C.) in the fully charged, partially charged or discharged state between the cycles. Batteries which are equipped with such a separator are thus very useful even in applications where heating to above 50° C. cannot be ruled out.

What is claimed is:

1. A porous separator for an electrochemical cell, comprising:
  (A) a flexible perforated support,
  (B) a first porous ceramic material coated as a first layer directly on the flexible perforated support and which fills the perforations in the flexible perforated support, and which
    (i) has a pore structure having an average pore size, and
    (ii) comprise an ion-conducting electrolyte,
  (C) a second layer covering the surface of the first layer of the first porous ceramic material wherein the second layer comprises fine particles of a second material, wherein the average particle size of the fine particles is in the range from 0.5 to 30% of the average pore size of the first porous ceramic material and at least a portion of the pores of the first porous ceramic material are filled with the fine particles of the second material, wherein the second material is at least one selected from the group consisting of $Li_2CO_3$, and $Li_xAl_yTi_z(PO_4)_3$ wherein $1 \leq x \leq 2$, $0 \leq y \leq 1$ and $1 \leq z \leq 2$.

2. The separator of claim 1, wherein the second material is different from the first porous ceramic material.

3. The separator of claim 1, wherein the second material comprises one or more selected from the group consisting of $SiO_2$, $Al_2O_3$, $ZrO_2$ and SiC.

4. The separator of claim 1, wherein the first porous ceramic material comprises the ion conducting electrolyte.

5. The separator of claim 1, wherein the fine particles are incorporated in the first porous ceramic material and are exposed the surface.

6. The separator of claim 1, wherein the first porous ceramic material is coated with the fine particles.

7. The separator of claim 1, wherein the first porous ceramic material has an average pore size in the range from 50 nm to 5 μm.

8. The separator of claim 1, wherein the first porous ceramic material has a porosity in the range from 10% to 70%.

9. The separator of claim 1, wherein the first porous ceramic material comprises one or more oxides selected from the group consisting of zirconium oxide, silicon oxide and aluminum oxide.

10. The separator of claim 1, wherein the first porous ceramic material is produced by solidifying a slip which contains first particles having a large average particle size which determine a pore structure of the first porous ceramic material and second particles having a smaller average primary particle size than the average particle size of the first particles and which adhere the first particles together during the solidifying of the slip.

11. The separator of claim 1, wherein the flexible perforated support comprises polymeric fibers, glass or ceramic.

12. The separator of claim 1, wherein the flexible perforated support comprises fibers.

13. The separator of claim 1, wherein the flexible perforated support comprises fibers and/or filaments from 1 to 150 μm and/or yarn from 3 to 150 μm in diameter.

14. The separator of claim 1, wherein the flexible perforated support is a nonwoven having a pore size from 5 to 500 μm.

15. The separator of claim 1, wherein the separator is stable under service conditions at not less than 100° C.

16. The separator of claim 1, wherein the separator ranges from 10 to 1000 μm in thickness.

17. The separator of claim 1, wherein the separator tolerates a bending radius down to 100 mm.

18. The separator of claim 1, wherein the first layer of the first porous ceramic material further comprises an adhesion promoter.

19. The separator of claim 1, wherein the first layer of the first porous ceramic material further comprises at least one adhesion promoter having at least one organofunctional group selected from the group consisting of a glycidyl group, a methacryloyl group, an amino group, and a vinyl group.

20. The separator of claim 1, wherein the first layer of the first porous ceramic material contains an adhesion promoter having at least one of a glycidyl group and a methacryloyl group.

21. The separator of claim 1, wherein the first layer of the first porous ceramic material comprises at least one adhesion promoter selected from the group consisting of 3-aminopropyltriethoxysilane, 2-aminoethyl-3-aminopropyltrimethoxysilane, 3-glycidyloxytrimethoxysilane, and 3-methacryloyloxypropyltrimethoxysilane.

22. The separator of claim 1, wherein the first layer consists of the first porous ceramic material.

23. The separator of claim 1, wherein the second layer consists of the second material.

24. The separator of claim 1, wherein the first layer consists of the first porous ceramic material, the second layer consists of the second material and the first and second materials are different.

* * * * *